United States Patent [19]

Dobson

[11] Patent Number: 4,722,377
[45] Date of Patent: Feb. 2, 1988

[54] TIRE SAFETY SUPPORT SYSTEM

[75] Inventor: Robert L. Dobson, Tallmadge, Ohio

[73] Assignee: The Goodyear Tire & Rubber Company, Akron, Ohio

[21] Appl. No.: 834,934

[22] Filed: Feb. 28, 1986

Related U.S. Application Data

[63] Continuation of Ser. No. 619,360, Jun. 11, 1984, abandoned.

[51] Int. Cl.⁴ .............................................. B60C 17/00
[52] U.S. Cl. .................................. 152/158; 152/311; 152/520
[58] Field of Search ............... 152/158, 157, 152, 310, 152/311, 313, 339.1, 520, 521

[56] References Cited

U.S. PATENT DOCUMENTS

| 2,745,461 | 5/1956 | Rossi | 152/158 |
| 3,022,810 | 2/1962 | Lambe | 152/157 |
| 3,100,518 | 8/1963 | Dresser | 152/347 |
| 3,574,317 | 4/1971 | Brewer | 152/313 |
| 3,650,865 | 3/1972 | Hawkes et al. | 156/119 |
| 3,676,028 | 7/1972 | Christie et al. | 425/38 |
| 3,794,706 | 2/1974 | Christie et al. | 264/45 |
| 4,071,386 | 1/1978 | Gomberg | 152/520 |
| 4,094,353 | 6/1978 | Ford | 152/310 |
| 4,197,893 | 4/1980 | O'Coin | 152/310 |
| 4,371,023 | 2/1983 | Campagna | 152/158 |

FOREIGN PATENT DOCUMENTS

| 0089914 | 9/1983 | European Pat. Off. | 152/520 |
| 0205692 | 11/1920 | France | 152/313 |
| 52-49503 | 4/1977 | Japan | 152/311 |
| 53-32503 | 3/1978 | Japan | 152/313 |
| 57-70704 | 5/1982 | Japan | 152/313 |

Primary Examiner—Donald E. Czaja
Assistant Examiner—Ramon R. Hoch
Attorney, Agent, or Firm—Frederick K. Lacher; H. C. Young, Jr.

[57] ABSTRACT

A safety support system for a tubeless tire and rim assembly which is adaptable for field mounting of the tire on the rim. The tire cavity within the tire contains a safety support body made up of an outer ring member and an inner ring member. The outer ring member is of resilient foam material providing cushioning and support of the tire. The inner ring member is of a substantially incompressible material which is flowable for injection into the tire cavity of the outer ring member and maintain the bead portions of the tire on said bead seats of said rim during operation.

6 Claims, 3 Drawing Figures

TIRE SAFETY SUPPORT SYSTEM

This is a continuation of application Ser. No. 619,360 filed June 11, 1984, now abandoned.

This invention relates generally, as indicated, to a safety support system in which a safety support body is positioned within a cavity in a tire mounted on a rim. The safety support body is divided into an inner ring member of substantially incompressible material positioned between the bead portions of the tire in a radially inner portion of the tire cavity and an outer ring member of high compression foam positioned radially outward of said inner ring member in the tire cavity. The invention is especially applicable to military vehicles where bullets may be shot through the walls of the tires.

Heretofore tire safety support and rim assemblies have been devised for supporting tires by partially or completely filling the tire cavity with a foam material. There have been problems, however, in obtaining high supporting pressures within the tires and mounting the tires on the rims at locations away from the factory.

In accordance with this invention there is provided a system in which the outer ring member of the annular safety support body is of resilient foam material containing cells of gas under pressure for providing support and cushioning of the vehicle on which the tire and rim assembly is mounted. The outer ring member has an inner diameter which is greater than the outer diameter of the rim flanges so that the tire with the outer ring member can be mounted on the rim even through the rim may be of the drop center type. After the tire and outer ring member are mounted on the rim, the inner ring member is formed by injecting a flowable substantially incompressible material under pressure into the space between the outer ring member and the rim so that the outer ring member is confined and will maintain the high effective pressure. The outer diameter of the inner ring member is preferably not greater than the outer diameter of the ply endings in the bead portions so that the inner ring member is not located in the working area of the tire. With the safety support system and method of this invention, the tire and safety support body is field mountable and at the same time provides the cushioning and support which is necessary for a bulletproof tire of this type.

In accordance with one aspect of the invention there is provided a safety support system for a tire and rim assembly in which the tire is a tubeless tire having a tread, sidewalls and bead portions mounted on bead seats of a rim, the tire having inner walls surrounding a tire cavity enclosed by the tire and the rim, the safety support system comprising a safety support body for filling at least a portion of the tire cavity and having an outer ring member and an inner ring member, the outer ring member being of resilient foam material containing cells of gas under pressure for expanding the body to provide cushioning and support of the tire while permitting flexibility of the bead portions for mounting the tire on the rim and the inner ring member being of a substantially incompressible material to support the outer ring member and maintain the bead portions on the bead seats after mounting of the tire on the rim.

In accordance with another aspect of this invention there is provided a method of making a safety support system for a tire and rim assembly in which the tire is a tubeless tire having a tread, sidewalls and bead portions mounted on bead seats of a rim, the tire having inner walls surrounding a tire cavity enclosed by the tire and the rim, comprising filling at least a portion of the tire cavity with a safety support body having an outer ring member and an inner ring member, forming the outer ring member of a resilient foam material containing cells of gas under pressure for expanding the body to provide cushioning and support of the tire and flexing of the bead portions during mounting of the tire on the rim, and forming the inner ring member of a substantially incompressible material to maintain the bead portions on the bead seats after mounting of the tire on the rim.

Other aspects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but several of the various ways in which the principles of the invention may be employed.

Figure 1:
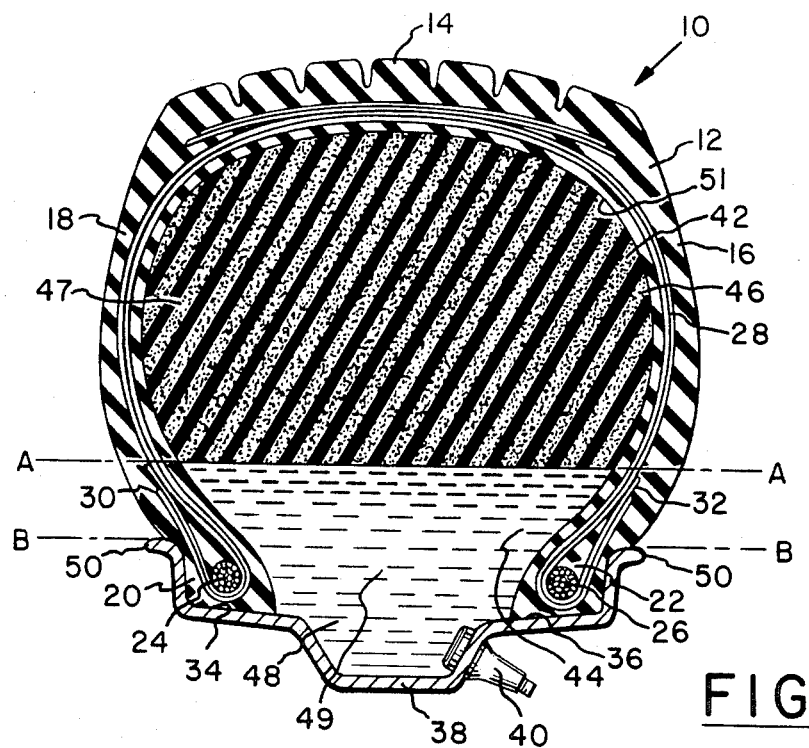
FIG. 1 is a cross-sectional view of one-half a tire and rim assembly embodying the invention taken along a radial plane containing the axis of the tire, rim and safety support body.

Referring to FIG. 1, a safety support system 10 is shown in which a tire 12, which may be tubeless, has a tread 14, sidewalls 16 and 18, and bead portions 20 and 22 containing bead rings 24 and 26 connected by reinforcing fabric plies 28 terminating in ply turnups having ends 30 and 32. The bead portions 20 and 22 of the tire 12 are seated on bead seats 34 and 36 of a drop center type rim 38 which is of substantially rigid material such as steel. A tire valve 40 is mounted on the rim 38.

The safety support system 10 of this invention includes a safety support body 42 completely filling a tire cavity 44 within the tire 12. The safety support body 42 has an outer ring member 46 of high pressure foam positioned in an outer portion 47 of the tire cavity 44. The safety support body 42 also has an inner ring member 48 of flowable substantially incompressible material formed by injection through the valve 40 into a radially inner portion 49 of the tire cavity 44.

In the embodiment shown in FIG. 1, the inner ring member 48 is formed of water; however, it may also be of other materials such as clay, silica or sand. The inner ring member 48 may also be of a flowable curable material such as rubber or urethane which is solidified after injection into the radially inner portion 49 of the tire cavity 44. A vent (not shown) may also be provided in the rim 38 to facilitate injection of the flowable curable material of the inner ring member 48 into the tire cavity 44.

The rim 38 has rim flanges 50 with an outer diameter, indicated by the line B—B in FIG. 1, which is less than the diameter of the inner surface of the outer ring member 46, indicated by the line A—A in FIG. 1. With this construction, the tire 12 and the outer ring member 46 contained therein may be mounted on the rim 38 in a conventional manner by pulling the bead portions 20 and 22 over the rim flanges 50 and moving them into the drop center of the rim. Also the diameter of the inner surface A—A of the outer ring member 48 is not appreciably greater than the diameter of the ply turnup ends 30 and 32 as shown in FIG. 1.

The outer ring member 46 shown in FIG. 1 is preferably made and assembled at the factory. A predetermined amount of rubber containing a heat-activatable blowing agent which may be in the form of a number of layered preform strips is positioned within the radially outer portion within the cavity 44 and then a rigid annular former having the same diameter as the diameter of the inner surface A—A of the outer ring member 46 is inserted in the tire 12 which then is mounted on the rim 38. The closed cell structure of the high compression foam in the outer ring member 46 is formed by heat activating the blowing agent during a vulcanization process to simultaneously expand the solid material placed within the tire cavity 44. The former may be inflatable in which case the inner surface A—A of the outer ring member 46 may be curved. The diameter of the inner surface A—A, for the purpose of this description, is the diameter of the edges where they join with the sidewalls 16 and 18 of the tire 12.

Vulcanization temperatures range from about 90° C. to about 200° C. Cell structure of the outer ring member 46 is required to be resilient in order to support the vehicle and the resiliency can be characterized by having a compressibility in the range of about one to about 800 pounds per square inch (psi) (0.0703 kg/cm$^2$ to about 56.25 kg/cm$^2$) and preferably about one to about 100 psi (0.0703 kg/cm$^2$ to about 7.0308 kg/cm$^2$) at 50 percent compression at 25° C.

The cell structure typically has an unloaded specific gravity equal to about 0.60 to about 1.40, preferably about 0.80 to about 1.16. The term "unloaded specific gravity" relates to the structural material such as rubber without being loaded with pigments and fillers such as carbon black, silica, zinc oxide and oils. The amount of internal cell pressure desired is dependent on the equivalent psi desired in the outer ring member 46. the equivalent pis desired in the outer ring member 46. The outer ring member 46 shown in FIG. 1 preferably has an equivalent pressure of from about 60 to 115 psie (4.22 kg/cm$^2$ to 8.09 kg/cm$^2$).

The term air pressure equivalent (psie) or equivalent psi as used in this description refers to the pressure of air in an encasement such as the tire cavity 44 which has a load deflection curve corresponding to the load deflection curve of the safety support body 42. Accordingly the equivalent psi (psie) of the safety support body 42 at a certain load deflection is the same as the air pressure (psi) of a corresponding encasement at the same load deflection.

The closed cell safety support body 42 can be of various cured or vulcanized rubbers such as natural rubber and synthetic rubber and their mixtures or blends. For example, they can by rubbery butadiene-styrene copolymers, butadiene-acrylonitrile copolymers, cis-1,4-polyisoprene, polybutadiene, isoprene-butadiene copolymers, butyl rubber, halogenated butyl rubber such as chloro or bromo butyl rubber, ethylene-propylene copolymers, ethylene-propylene terpolymers and polyurethane elastomers. Typically the various polymers are cured or vulcanized by normal curing methods and recipes such as with sulfur, or with peroxides in the case of the ethylene-propylene copolymers, or with primary diamines in the case of polyurethane elastomers. The sulfur cured or vulcanized natural rubber and synthetic rubbery polymers are preferred such as natural rubber and cis-1, 4-polyisoprene. The blowing agents used in the practice of this invention for the manufacture of the safety support body 42 are those which liberate gases upon heating.

Representative examples of such agents are those which liberate gases such as nitrogen, carbon dioxide, ammonium bicarbonate and sodium bicarbonate and cause the formation of the integral closed cell outer ring member 46. Usually agents which liberate nitrogen are preferred. Such blowing agents are compounds which give off gases upon being triggered by the vulcanization temperatures, representative of which are nitro, sulfonyl and azo compounds such as dinitrosopentamethylene tetramine, N,N'-dimethyl-N,N'dinitrosophthalamide, azodicarbonamide, sulfonyl hydrazides such as benzenesulfonyl hydrazide, toluenesulfonyl hydrazide and p,p'-oxy-bis(benzenesulfonyl) hydrazide and sulfonyl semicarbazides such as p-toluene sulfonyl semicarbazide and p,p'-oxy-bis(benzenesulfonyl semicarbazide). In this embodiment the rubber of a specially compounded rubber expanded as the blowing agent was heat activated during the vulcanization process to form an integral closed cell structure having a density of about 45 pounds per cubic foot (72.19 kg/cm$^3$) and a compressibility of about 28 pounds per square inch (1.97 kg/cm$^2$) at a fifty percent compression.

The outer ring member 46 may be adhered to inner walls 51 of the tire 12 in the tire cavity 44 by a curing reaction of the material of the outer ring member with the material of the inner walls. Also, an adhesive may be applied to the inner walls 51 before forming the outer ring member 46 in the tire 12.

After forming of the outer ring member 46 in the tire 12 the tire may be removed from the rim 38 and mounted on another drop center rim. The liquid of the inner ring member 48 is injected through the tire valve 40 to hold the tire bead portions 20 and 22 in the seated condition in the bead seats 34 and 36, respectively, and to support the high pressure foam material of the outer ring member 46. To remove the tire 12 from the drop center rim 38, it is only necessary to open the tire valve 40 and drain the liquid of the inner ring member 48 from the space between the rim and the outer ring member 46. The bead portions 20 and 22 may then be moved into the drop center of the rim 38 and removed in a manner similar to the removal of a conventional tire.

Figure 2:
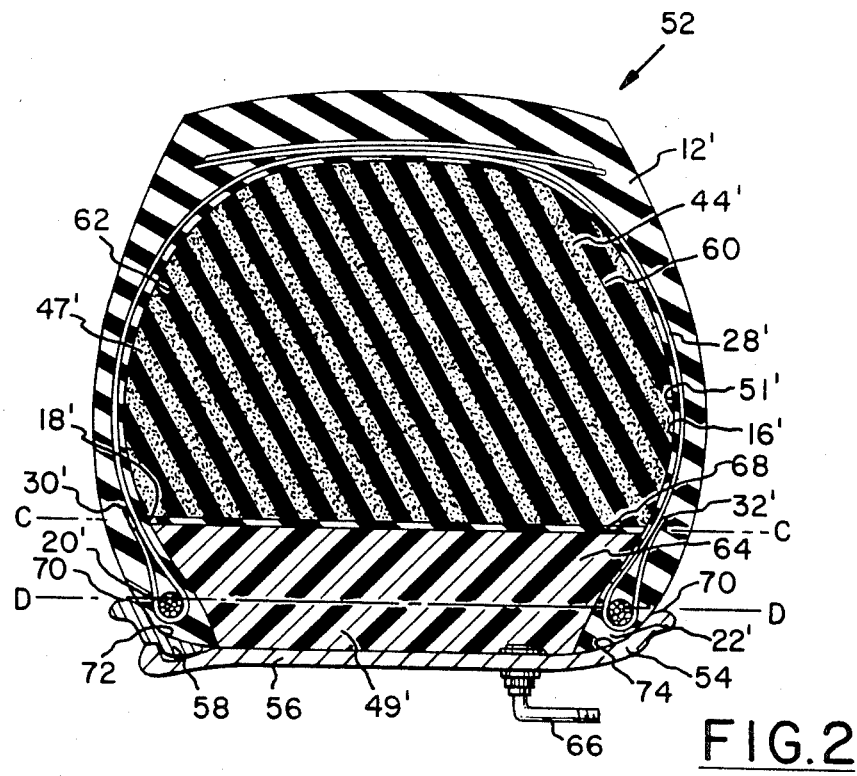
FIG. 2 is a sectional view like FIG. 1 showing a modified safety support system embodying the invention.

Referring to FIG. 2, a modified safety support system 52 embodying the invention is shown in which the tire 12' is mounted on a two-piece rim 54 having a generally cylindrical member 56 and a split ring member 58 which can be mounted on the cylindrical member and removed in a manner well known to those skilled in the art.

The modified safety support system 52 of FIG. 2, includes a safety support body 60 completely filling a tire cavity 44' surrounded by inner walls 51' of the tire 12'. The safety support body 60 has an outer ring member 62 of high pressure foam positioned in an outer portion 47' of the tire cavity 44'. The safety support body 60 has an inner ring member 64 of flowable substantially incompressible material formed by injection through a valve 66 in the rim 54 into a radially inner portion 49' of the tire cavity 44'.

In the embodiment shown in FIG. 2, the inner ring member 64 is formed of a flowable curable material such as urethane which is soldified after injection into the radially inner portion of the tire cavity 48. The outer ring member 62 is formed of a high pressure foam whic may be the same material described for the outer ring member 46, hereinabove. A sealing layer 68 of substantially impermeable material, such as rubber or urethane, may be positioned between the outer ring member 62 and inner ring member 64 to seal the space in the upper portion 47' of the tire cavity 44' where the outer ring member 62 is located from the flowable curable material of the inner ring member 64. In this embodiment, the diameter of the radially inner surface of the outer ring member 62, indicated by line C—C, is not appreciably greater than the outer diameter of the ply turnup ends 30' and 32' of the tire 12' as shown in FIG. 2 so that the incompressible material of the inner ring member 64 is not in the working area of the tire. The inner surface C—C of the outer ring member 62 may also be curved in which case the diameter is the diameter of the edges where they join the sidewalls 16' and 18' of the tire 12'.

Preferably, the diameter of the inner surface C—C of the outer ring member 62 is greater than outer diameter D—D of rim flanges 70 of the split ring 58 and cylindrical member 56 of the rim 54 so that the inner ring member 64 will maintain the bead portions 20' and 22' seated in bead seats 72 and 74 of the split ring and cylindrical member, respectively. The urethane of the inner ring member 64 is formed under pressure so that the outer ring member 62 is supported and confined in a limited space to provide the desired high effective pressure (psie) with a network of strong connections between the cells.

The outer ring member 62 is preferably made and assembled at the factory in a manner substantially the same as that described hereinabove for the outer ring member 46 of the embodiment shown in FIG. 1. The outer ring member 62 may be adhered to the inner walls 51' of the tire cavity 44' by an adhesive applied before the outer ring member is formed in the radially outer portion 47' of the tire cavity or by the reaction between the material of the inner walls and the material of the outer ring member during the forming process. The sealing layer 68 may be applied after forming of the outer ring member 62 or may be formed during the forming of the outer ring member as a skin on the radially inner surface C—C.

The tire 12' and the outer ring member 62 may be mounted on the cylindrical member 56 of the rim 54 and then the split ring 58 applied to seat the bead portions 20' and 22' in the bead seats 72 and 74. The urethane of the inner ring member 64 may then be injected through the valve 66 and cured by the application of heat to the safety support system 52. To remove the tire 12' from the rim 56, the split ring member 58 is removed and the tire pulled off the cylindrical member 56.

Figure 3:
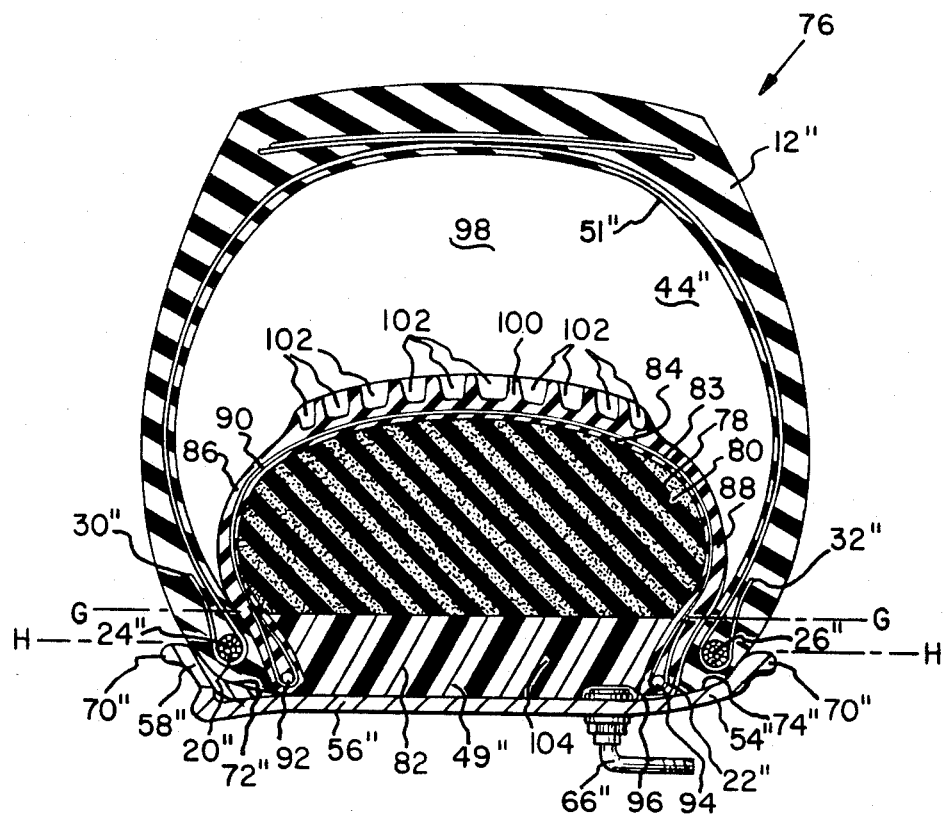
FIG. 3 is a sectional view like FIG. 2 showing another modified safety support system embodying the invention.

Referring to FIG. 3, another modified safety support system 76 is shown in which the tire 12" is mounted on a two-piece rim 54" having a generally cylindrical member 56" and a split ring member 58" which can be mounted on the cylindrical member and removed in a manner well known to those skilled in the art.

The modified safety support system 76 of FIG. 3 includes a safety support body 78 positioned in the tire cavity 44" and having an outer ring member 80 of high pressure foam positioned radially outward of an inner ring member 82 of flowable substantially incompressible material which is positioned around the rim 56". The outer ring member 80 and inner ring member 82 are contained by an annular shield 83 including a radially outer wall 84 and sidewalls 86 and 88 of resilient rubber-like material. The shield 83 is reinforced by at least one ply 90 of reinforcing fabric wrapped around the radially outer wall 84 and extending through the sidewalls 86 and 88 to a pair of reinforcing safety support bead rings 92 and 94 positioned at the surface of the safety support body 78 at each side of the body. The safety support bead rings 92 and 94 preferably have a diameter not greater than the diameter of the bead rings 24" and 26" of the tire 12".

A flap 96 which may be fastened to the valve 66" extends from the valve to a position adjacent the sidewall 88 of the safety support 78 and has at least one groove for communication with a tire inflation portion 98 of the tire cavity 44". The tire inflation portion 98 is defined by the outer wall 84 of the shield 83 and the inner wall 51" of the tire 12". The outer wall 84 of the shield 83 has a radially outer diameter which is less than the radially inner diameter of the inner wall 51". Preferably the section height of the shield 83 is about sixty percent the section height of the tire 12". A tread portion 100 may be provided at the outer wall 84 and may have holes 102 for retaining a lubricant (not shown).

The inner ring member 82 of the safety support body 78 is of a flowable substantially incompressible material formed by injection through a valve (not shown) in the rim 54" into a radially inner portion 49" of the tire cavity 44". In the embodiment shown in FIG. 3, the inner ring member 82 is formed of a flowable curable material such as urethane which is solidified after injection into the radially inner portion 49" of the tire cavity 44" in a similar manner to that described for the inner ring member 64 hereinabove. Alternatively the inner ring member 82 may be formed of water or other flowable substantially incompressible material such as clay, silica or sand. In this embodiment, the diameter of the radially inner surface of the outer ring member 80, indicated by line G—G, is preferably less than and not appreciably greater than the outer diameter of the ply turnup ends 30" and 32" of the tire 12" so that the incompressible material of the inner ring member 82 is not in the working area of the tire.

Preferably the diameter of the inner surface G—G of the outer ring member 80 is greater than outer diameter H—H of the rim flanges 70" so that the substantially incompressible inner ring member 82 will maintain the bead portions 20" and 22" seated in the bead seats 72" and 74" of the split ring 58" and cylindrical member 56". The urethane of the inner ring member 82 is formed under pressure so that the outer ring member 80 is supported and confined in a limited space to provide the desired high effective pressure (psie) with a network of strong connections between the cells.

In the manufacture of the safety support system 76 shown in FIG. 3, the outer wall 84 and sidewalls 86 and 88 of the safety support body 78 may be built on a cylindrical drum and then shaped and vulcanized to the configuration of the shield 83 shown in FIG. 3 following procedures well known to those skilled in the art of tire manufacturing. The safety support system 76 may then be assembled by first inserting the shield 83 in the tire 12".

The outer ring member 80 is then made and assembled in the shield 83 in substantially the same manner as described hereinabove for the outer ring member 46 of the embodiment shown in FIG. 1. The outer ring member 80 may be adhered to the radially outer wall 84 by an adhesive applied before the outer ring member is formed or by the reaction between the material of the outer wall and the material of the outer ring member during the forming process.

The tire 12" with the shield 83 containing the outer ring member 80 may then be mounted on the rim 56" and the flowable substantially incompressible material of the inner ring member 82 injected into a cavity 104 between the outer ring member and the rim 56". The tire 12" may then be inflated by injecting air through the valve 66" and flap 96 into the tire inflation portion 98 of the tire cavity 44".

An alternative method of making and assembling the safety support system 76 shown in FIG. 3 is to form the foamed outer ring member 80 in the cavity within the shield 83 at the factory and before mounting in the tire 12". The shield 83 may then be compressed and inserted in the tire cavity 44" at a later time. The tire and shield assembly is then mounted on the rim 54" and a flowable substantially incompressible material injected into the cavity 104 between the outer ring member 80 and the rim to form the inner ring member 82. To remove the tire 12" containing the safety support system 76 from the rim 54", the split ring member 58" is removed and the tire 12" pulled off the cylindrical member 56".

Preferably the flowable substantially incompressible material or flowable curable material of the inner ring members 48, 64 and 82 of the three embodiments shown is injected into the tire cavity 44, 44' or the cavity 104 in the shield 83 with sufficient force to at least slightly expand the tires 12, 12' or the shield 83 and fully extend and slightly stretch the reinforcing cords of the reinforcing fabric plies 28, 28' or 90 so that the cords will be placed under tension and resist failure as by fatigue. The desired force may be obtained by injection of the material of the inner ring members 48, 64 and 82 at pressures in the range of from about 25 psi (1.76 kg/cm$^2$) for a relatively low pressure foam in the outer ring members 46, 62 and 80 to about 200 psi (14.06 kg/cm$^2$) for a relatively high pressure foam in the outer ring members.

While certain representative embodiments and details have been shown for the purpose of illustrating the invention, it will be apparent to those skilled in the art that various other changes and modifications may be made therein without departing from the spirit or scope of the invention.

What is claimed is:

1. A safety support system for a tire and rim assembly in which the tire is a tubeless tire having a tread, sidewalls and bead portions mounted on bead seats of a rim, said tire having inner walls surrounding a tire cavity enclosed by said tire and said rim, said safety support system comprising a safety support body completely filling said tire cavity and having an outer ring member and an inner ring member, said outer ring member being of resilient foam material containing cells of gas under pressure formed in said tire prior to mounting of said tire on said rim for expanding said body to provide cushioning and support of said tire while permitting flexibility of said bead portions for mounting said tire on said rim, and said inner ring member being of a solid, nonfoamed material formed by injection into a radially inner portion of said tire cavity after mounting of said tire on said rim to support said outer ring member and maintain said bead portions on said bead seats after mounting of said tire on said rim.

2. The safety support system of claim 1 wherein said outer ring member is adhered to at least a portion of said inner walls.

3. The safety support system of claim 1 wherein said rim has rim flanges and said outer ring member has an inner diameter greater than an outer diameter of said rim flanges.

4. The safety support system of claim 1 wherein said outer ring member has a sealing layer of substantially impermeable material between said outer ring member and said inner ring member.

5. A safety support system for a tire and rim assembly in which the tire is a tubeless tire having a tread, sidewalls and bead portions mounted on bead seats of a rim, said tire having inner walls surrounding a tire cavity enclosed by said tire and said rim, said safety support system comprising a safety support body contained in an annular shield in said tire cavity, said shield having a predetermined radially outer diameter less than the radially inner diameter of said tire cavity and said safety support body having a radially inner diameter substantially the same as the diameter of said rim, said safety support body having an outer ring member and an inner ring member completely filling the space within said shield, said outer ring member being of resilient foam material containing cells of gas under pressure formed in said tire prior to mounting of said tire on said rim for expanding said body to provide cushioning and support of said tire while permitting flexibility of said bead portions for mounting said tire on said rim, and said inner ring member being of a solid, nonfoamed material formed by injection into a radially inner portion of said tire cavity after mounting of said tire on said rim to support said outer ring member and maintain said bead portions on said bead seats after mounting of said tire on said rim.

6. The safety support system of claim 5 wherein said annular shield has a pair of safety support bead rings positioned in sidewalls at each side of said body, a radially outer wall connecting said sidewalls and at least one ply of reinforcing fabric extending between said safety support bead rings through said sidewalls and said outer wall.

* * * * *